Figure 1:
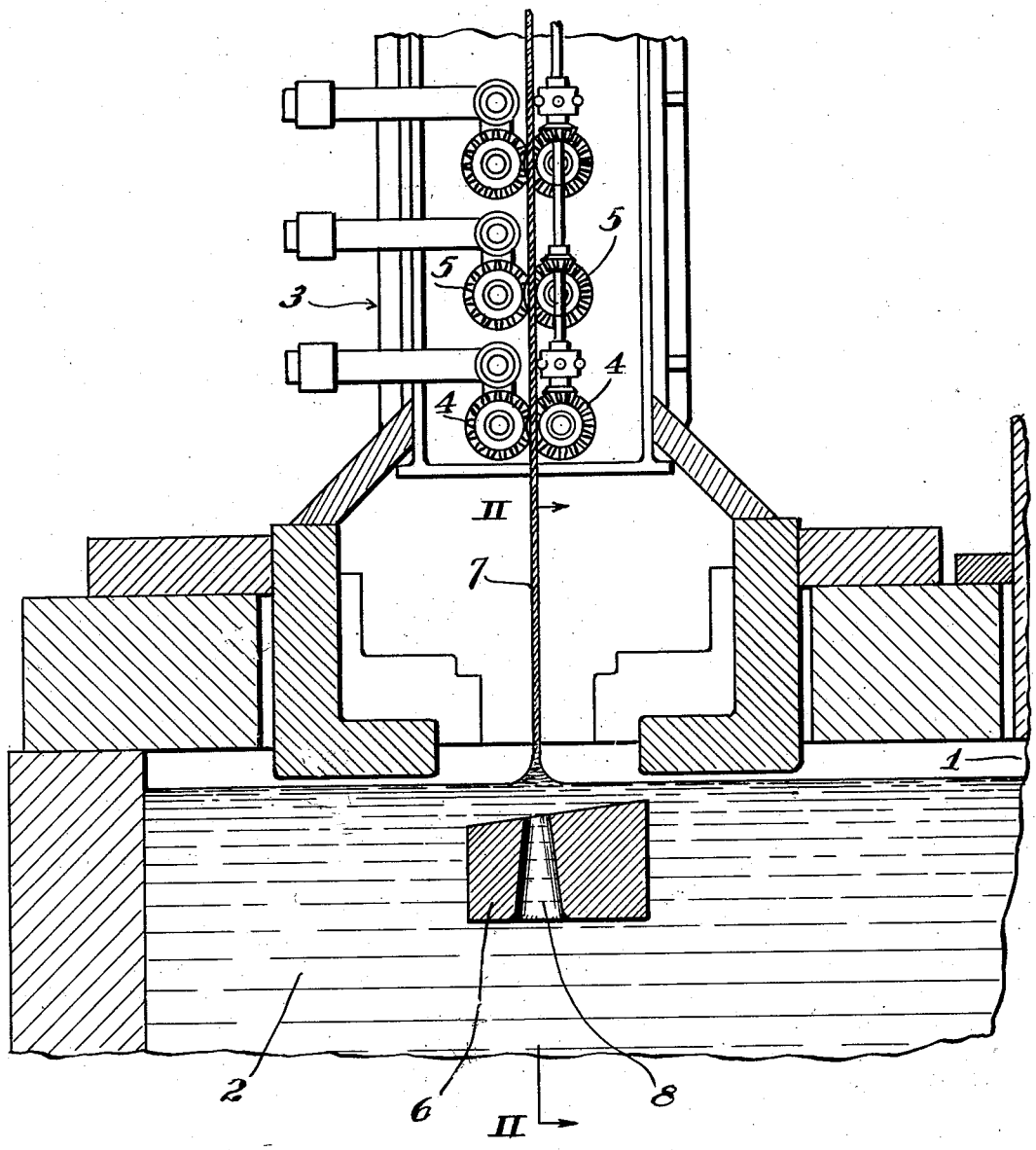

April 8, 1930.  H. L. HALBACH  1,753,291

APPARATUS FOR DRAWING SHEET GLASS

Filed April 4, 1928  2 Sheets-Sheet 1

INVENTOR
Howard L. Halbach
by
James C. Bradley
Atty

April 8, 1930. H. L. HALBACH 1,753,291
APPARATUS FOR DRAWING SHEET GLASS
Filed April 4, 1928 2 Sheets-Sheet 2
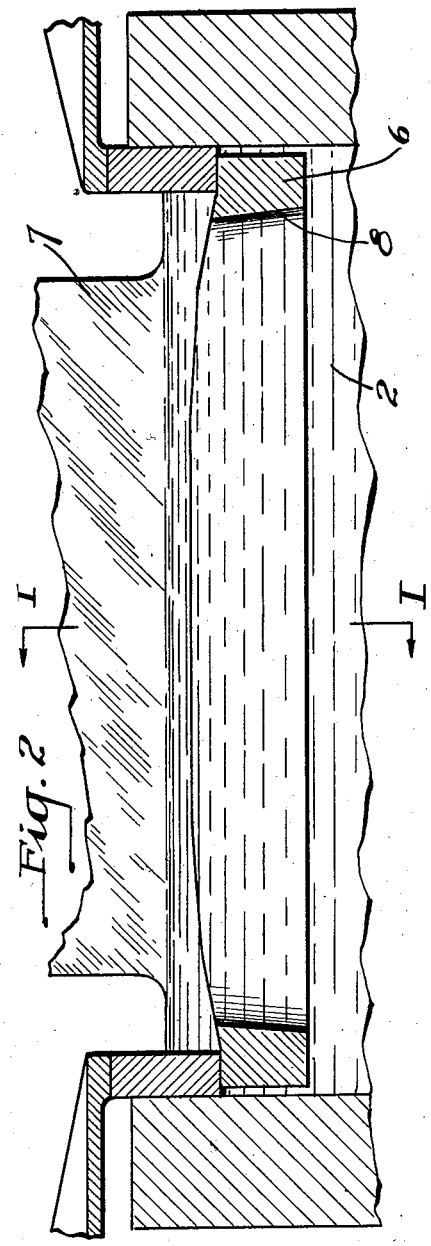
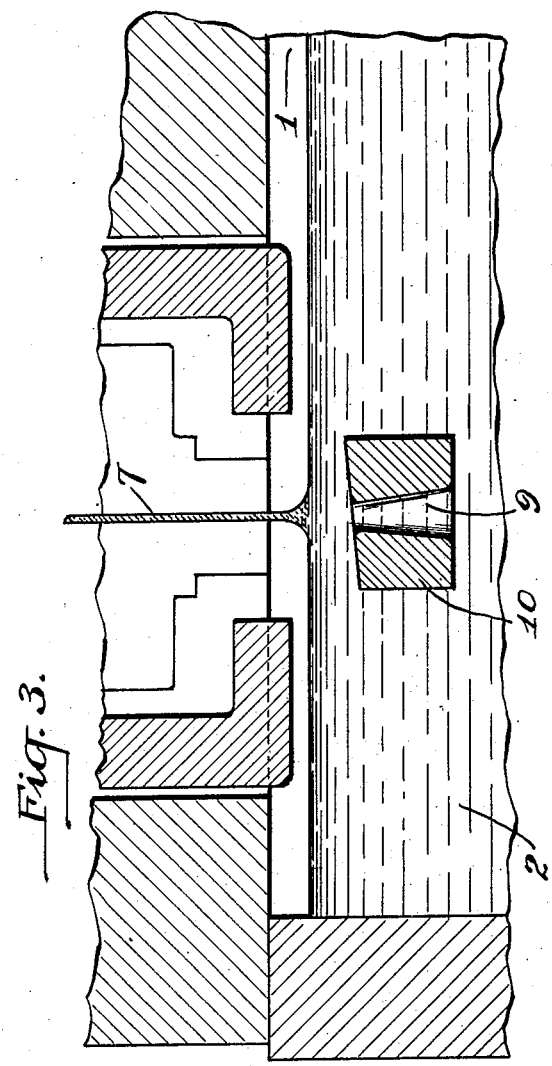
INVENTOR
Howard L. Halbach
by James C. Bradley
atty Patented Apr. 8, 1930

1,753,291

UNITED STATES PATENT OFFICE

HOWARD L. HALBACH, OF CLARKSBURG, WEST VIRGINIA, ASSIGNOR TO PITTSBURGH PLATE GLASS COMPANY, A CORPORATION OF PENNSYLVANIA

APPARATUS FOR DRAWING SHEET GLASS

Application filed April 4, 1928. Serial No. 267,241.

The invention relates to apparatus for drawing sheet glass. It has for its principal objects the provision of improved means for equalizing the temperature of the glass in the bath on the opposite sides of the sheet being drawn from the forehearth or drawing tank. In such a tank, which communicates at one end with the melting tank, there is a tendency for the glass on the side of the drawbar nearest the melting tank to run at a higher temperature than that of the glass on the far side of the drawbar. I have found it possible to counteract this tendency by the construction of the drawbar, two novel features contributing to this result, one being the location of the slot off center with respect to the center line of the bar, and the other being the inclination of the top of the bar. Certain embodiments of the invention are illustrated in the accompanying drawings, wherein:

Figure 1 is a vertical section through the apparatus on the line I—I of Fig. 2. Fig. 2 is a vertical section on the line II—II of Fig. 1. And Fig. 3 is a vertical section showing a modification.

Referring to the drawings, 1 is the end of a melting tank, preferably of the regenerator type; 2 is a forehearth or drawing tank communicating at its end with the melting tank; 3 is a drawing machine provided with a series of drawing rolls driven from the gears 4—4, 5—5, etc.; and 6 is the draw bar which extends transversely of the bath from one side of the drawing tank to the other beneath the line of generation of the sheet 7.

The drawing bar 6 is provided with a vertical slot 8 extending longitudinally of the bar and located off center with respect to the center line of the bar; that is, it is closer to the side of the bar remote from the melting tank than it is to its other side. During the drawing operation, the sheet is maintained in alignment with the drawing slot and the shielding and cooling effect of the bar is, therefore, greater on the body of glass above the bar on the side toward the melting tank than on the side remote from the melting tank. As a result, the temperature of the glass in the bath on the two sides of the sheet and lying above the bar is equalized. This has been found to be a desirable condition, reducing the tendency of the sheet to warp and to break. This equalizing tendency is also promoted by inclining the top surface of the bar, as indicated in Fig. 1, so that said top surface slopes upwardly from said side of the bar remote from the tank to its other side. The shielding and chilling effect of the bar is dependent upon its distance from the surface of the glass, so that this upward inclination of the top surface of the bar tends to maintain the glass cooler on the side toward the melting tank than on its other side.

Fig. 3 illustrates a modification in which the slot 9 is located on the center line of the draw bar 10 instead of being located off center with respect thereto. This bar has the upwardly inclined top surface as in the bar 6 of Fig. 1, such inclination being entirely relied upon to give the equalizing effect desired. Under certain conditions, this will give the desired equalizing effect without having the slot off center as in the Fig. 1 construction. In both types of construction, the center portion of the bar, as indicated in Fig. 2, approaches somewhat closer to the surface of the bath than it does at its ends, which tends to give some additional cooling effect at the center of the sheet where the glass is inclined to run hotter than at the edges.

What I claim is:

1. The combination with a drawing tank communicating at one end with a melting tank and a machine for drawing a glass sheet continuously from the drawing tank with the plane of the sheet transverse to such drawing tank, of a draw bar extending transversely of the bath beneath the sheet with a longitudinal vertical slot therethrough which lies closer to the side of the bar remote from the melting tank than to its other side.

2. The combination with a drawing tank communicating at one end with a melting tank and a machine for drawing a glass sheet continuously from the drawing tank with the plane of the sheet transverse to such drawing tank, of a draw bar extending transversely of the bath beneath the sheet with a longitudinal vertical slot therethrough which lies closer to the side of the bar remote from the melting tank than to its other side, said bar having its top surface inclined upwardly from the side of the bar remote from the melting tank to its other side.

3. The combination with a drawing tank communicating at one end with a melting tank and a machine for drawing a glass sheet continuously from the drawing tank with the plane of the sheet transverse to such drawing tank, of a draw bar extending transversely of the bath beneath the sheet and having its top surface inclined upwardly from the side of the bar remote from the melting tank to its other side.

4. The combination with a drawing tank communicating at one end with a melting tank and a machine for drawing a glass sheet continuously from the drawing tank with the plane of the sheet transverse to such drawing tank, of a draw bar extending transversely of the bath beneath the sheet with a longitudinal vertical slot therethrough, said bar having its top surface inclined upwardly from the side of the bar remote from the melting tank to its other side.

In testimony whereof, I have hereunto subscribed my name this 30th day of March, 1928.

HOWARD L. HALBACH.